United States Patent
Line et al.

(10) Patent No.: US 8,931,844 B2
(45) Date of Patent: Jan. 13, 2015

(54) EASY SLIM FOLD SEAT

(75) Inventors: Johnathan Andrew Line, Northville, MI (US); Daniel Ferretti, Commerce Township, MI (US); Gornique'Ka Mo'Nya Heath, Taylor, MI (US); Dumitru Dan Nae, Troy, MI (US); John W. Jaranson, Dearborn, MI (US); Curtis D. Stanhope, Pinckney, MI (US); Kurt Kormos, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 13/540,503

(22) Filed: Jul. 2, 2012

(65) Prior Publication Data

US 2014/0001809 A1 Jan. 2, 2014

(51) Int. Cl.
*B60N 2/02* (2006.01)

(52) U.S. Cl.
USPC ........................................ 297/378.1; 297/340

(58) Field of Classification Search
CPC ...... B60N 2/30; B60N 2/3004; B60N 2/3006; B60N 2/3063; B60N 2/3065; B60N 2/3072; B60N 2/3075
USPC .............................. 297/340, 378.1; 296/65.09
See application file for complete search history.

(56) References Cited

U.S. PATENT DOCUMENTS

| | | | |
|---|---|---|---|
| 4,957,321 A * | 9/1990 | Martin et al. | 296/65.09 |
| 5,570,931 A | 11/1996 | Kargilis et al. | |
| 5,927,679 A | 7/1999 | Hill | |
| 6,000,742 A * | 12/1999 | Schaefer et al. | 296/65.09 |
| 7,029,063 B2 * | 4/2006 | Holdampf | 297/15 |
| 7,712,836 B2 | 5/2010 | Deml | |
| 2005/0269830 A1 * | 12/2005 | Epaud | 296/65.09 |
| 2006/0033373 A1 * | 2/2006 | Kammerer | 297/378.1 |
| 2009/0001795 A1 * | 1/2009 | Homier et al. | 297/341 |
| 2009/0167046 A1 * | 7/2009 | Yamagishi | 296/65.08 |
| 2011/0037304 A1 * | 2/2011 | Kammerer | 297/340 |

FOREIGN PATENT DOCUMENTS

WO 2005102112 A2 11/2005

* cited by examiner

*Primary Examiner* — Philip Gabler
(74) *Attorney, Agent, or Firm* — Vichit Chea; Price Heneveld LLP

(57) ABSTRACT

A vehicle seating assembly including a seat having a top surface. A seatback includes a back support surface. A tab extends forward from the seatback. A track assembly includes a rail and a slide. A bracket is coupled to the slide and includes an elongate slot disposed at a mid-portion thereof. A linkage includes a first end coupled with the seat. A second end is coupled with the tab. A protrusion is disposed at an intermediate portion of the linkage and is engaged with the elongate slot. Movement of the protrusion is relative to the elongate slot, causing translation of the seating assembly between a deployed position, in which a planar extent of the seatback extends substantially orthogonally relative to a planar extent of the seat, and a stowed position, in which the top surface of the seat and the back support surface of the seatback are in abutting contact.

18 Claims, 9 Drawing Sheets

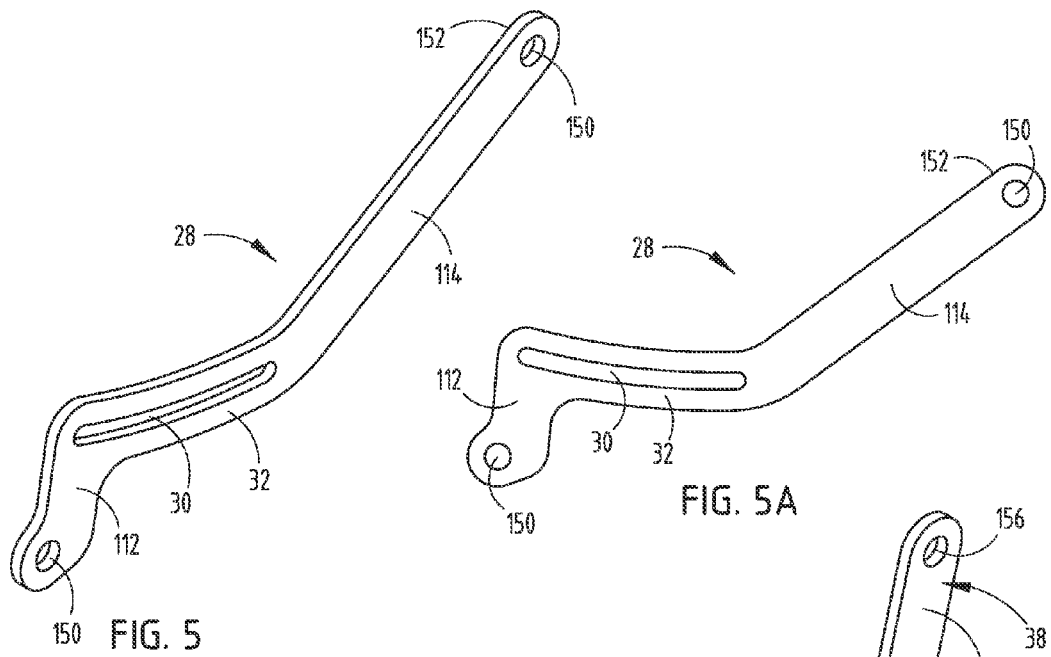
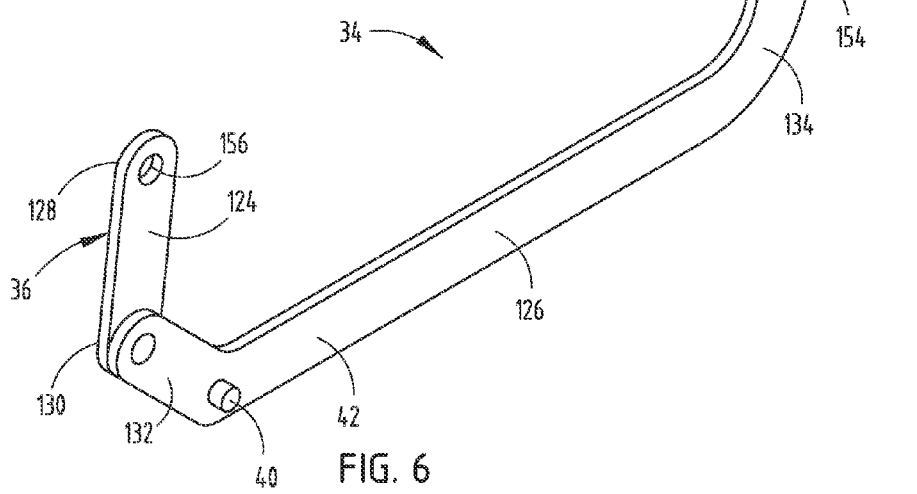
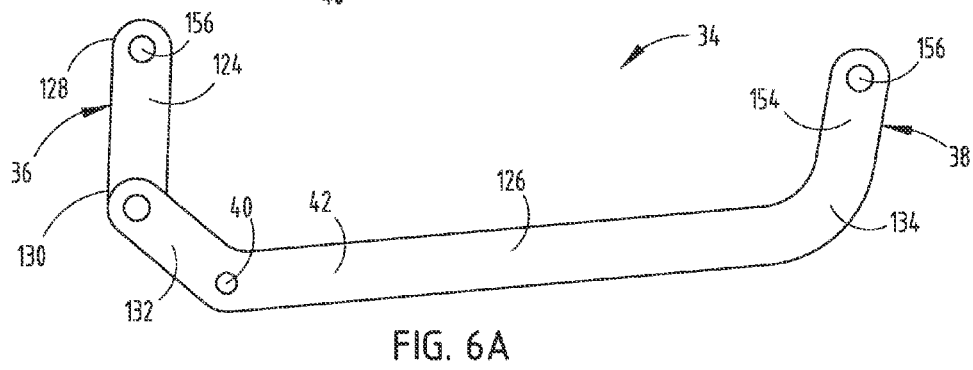

US 8,931,844 B2

EASY SLIM FOLD SEAT

FIELD OF THE INVENTION

The present invention generally relates to a vehicle seating assembly, and more particularly to an easy slim fold seat for a vehicle seating assembly.

BACKGROUND OF THE INVENTION

Vehicle seating assemblies are configured to fold and collapse to a variety of configurations. Seat features that provide for increased vehicle storage capacity are beneficial for a variety of reasons, including allowing vehicle sizes to be reduced while maintaining some interior vehicle storage capacity.

SUMMARY OF THE INVENTION

According to one aspect of the present invention, a vehicle seating assembly includes a seat having a top surface. A seatback includes a back support surface. A tab extends forward from the seatback. A track assembly includes a rail and a slide. A bracket is coupled to the slide and includes an elongate slot disposed at a mid-portion thereof. A linkage includes a first end coupled with the seat. A second end is coupled with the tab. A protrusion is disposed at an intermediate portion of the linkage and is engaged with the elongate slot. Movement of the protrusion is relative to the elongate slot, causing translation of the seating assembly between a deployed position, in which a planar extent of the seatback extends substantially orthogonally relative to a planar extent of the seat, and a stowed position, in which the top surface of the seat and the back support surface of the seatback are in abutting contact.

According to another aspect of the present invention, a vehicle seating assembly includes a seat coupled to a seatback. A bracket is coupled with a base. A linkage includes a first end coupled with the seat. A second end is coupled with the seatback. An intermediate portion is slidably engaged with the bracket. Movement of the bracket is relative to the linkage, causing translation of the vehicle seating assembly between a deployed position and a stowed position.

According to yet another aspect of the present invention, a vehicle seating assembly includes a seat and a seatback. A linkage includes a front link coupled with a rear link. The front link and rear link are coupled with the seat and seatback, respectively. A bracket is coupled to the linkage and includes an arcuate slot. Movement of the linkage along the arcuate slot causes translation of the vehicle seating assembly between a deployed position and a stowed position.

According to another aspect of the present invention, a vehicle seating assembly is articulated between a deployed position and a substantially flat stowed position, such that a seat and a seat cushion of the seating assembly are collapsed substantially rearward, in addition to collapsing downward to a closer proximity with a floor of a vehicle. The collapsed orientation of the seat and the seat cushion in the stowed position permits a head restraint portion attached to a seatback to freely occupy an area in front of the a forward portion of the seat when the seatback is pivoted forward to the substantially flat stowed position. Further, collapsed orientation of the seat in the stowed position permits a vehicle seat positioned in front of the vehicle seating assembly to be freely adjusted in the horizontal fore and aft directions without contacting the seat of the vehicle seating assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 of a top perspective view of a bracket of a vehicle seating assembly;

FIG. 5A is a side elevational view of the bracket of FIG. 5;

FIG. 6 is a top perspective view of a linkage of a vehicle seating assembly;

FIG. 6A is a side elevational view of the linkage of FIG. 6;

DETAILED DESCRIPTION OF THE EMBODIMENTS

Figure 1:
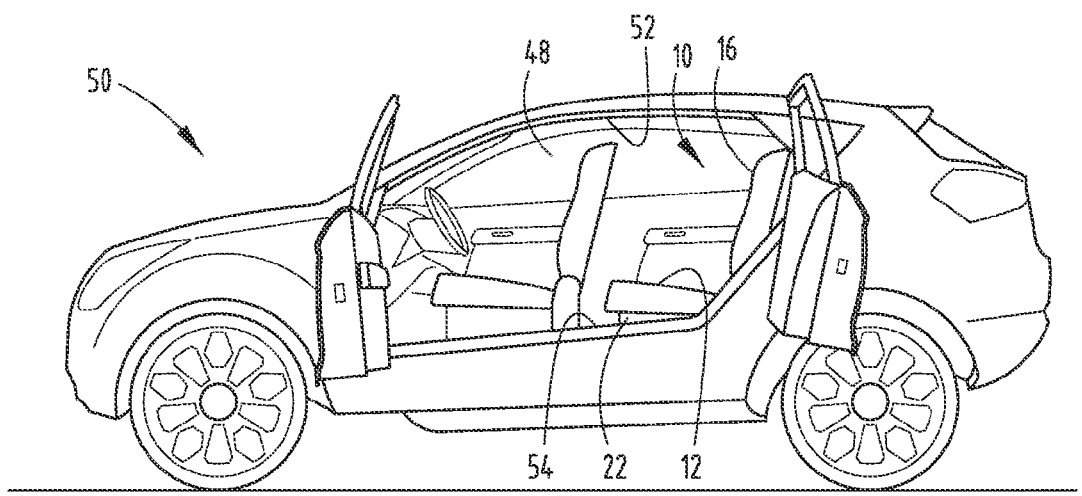
FIG. 1 is a side perspective view of one embodiment of a vehicle seating assembly of the present invention in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-10, reference numeral 10 generally designates a vehicle seating assembly including a seat 12 having a top surface 14. A seatback 16 includes a back support surface 18. A tab 20 extends forward from the seatback 16. A track assembly 22 includes a rail 24 and a slide 26. A bracket 28 is coupled to the slide 26 and includes an elongate slot 30 disposed at a mid-portion 32 thereof. A linkage 34 includes a first end 36 coupled with the seat 12. A second end 38 is coupled with the tab 20. A protrusion 40 is disposed at an intermediate portion 42 of the linkage 34 and is engaged with the elongate slot 30. Movement of the protrusion 40 in relation to the elongate slot 30 causes translation of the vehicle seating assembly 10 between a deployed position 44, in which a planar extent of the seatback 16 extends substantially orthogonally relative to a planar extent of the seat 12, and a stowed position 46, in which the top surface 14 of the seat 12 and the back support surface 18 of the seatback 16 are in abutting contact.

As illustrated in FIG. 1, the vehicle seating assembly 10 (FIG. 2) is positioned in the rear seat location within an interior 48 of a vehicle 50. It is also contemplated that the vehicle seating assembly 10 may be positioned at various seat locations within the interior 48 of the vehicle 50, including a second row seat location, a front seat location, and other conceivable vehicle occupant seat locations. The interior 48 of the vehicle 50 is generally defined between a ceiling 52 and a floor 54 of the vehicle 50. The floor 54 of the vehicle 50 is substantially planar and extends within the interior 48 of the vehicle 50. The vehicle seating assembly 10 is supported by and attached to the floor 54. More specifically, the vehicle seating assembly 10 is coupled with the floor 54 of the vehicle 50 about the track assembly 22.

Figure 2:
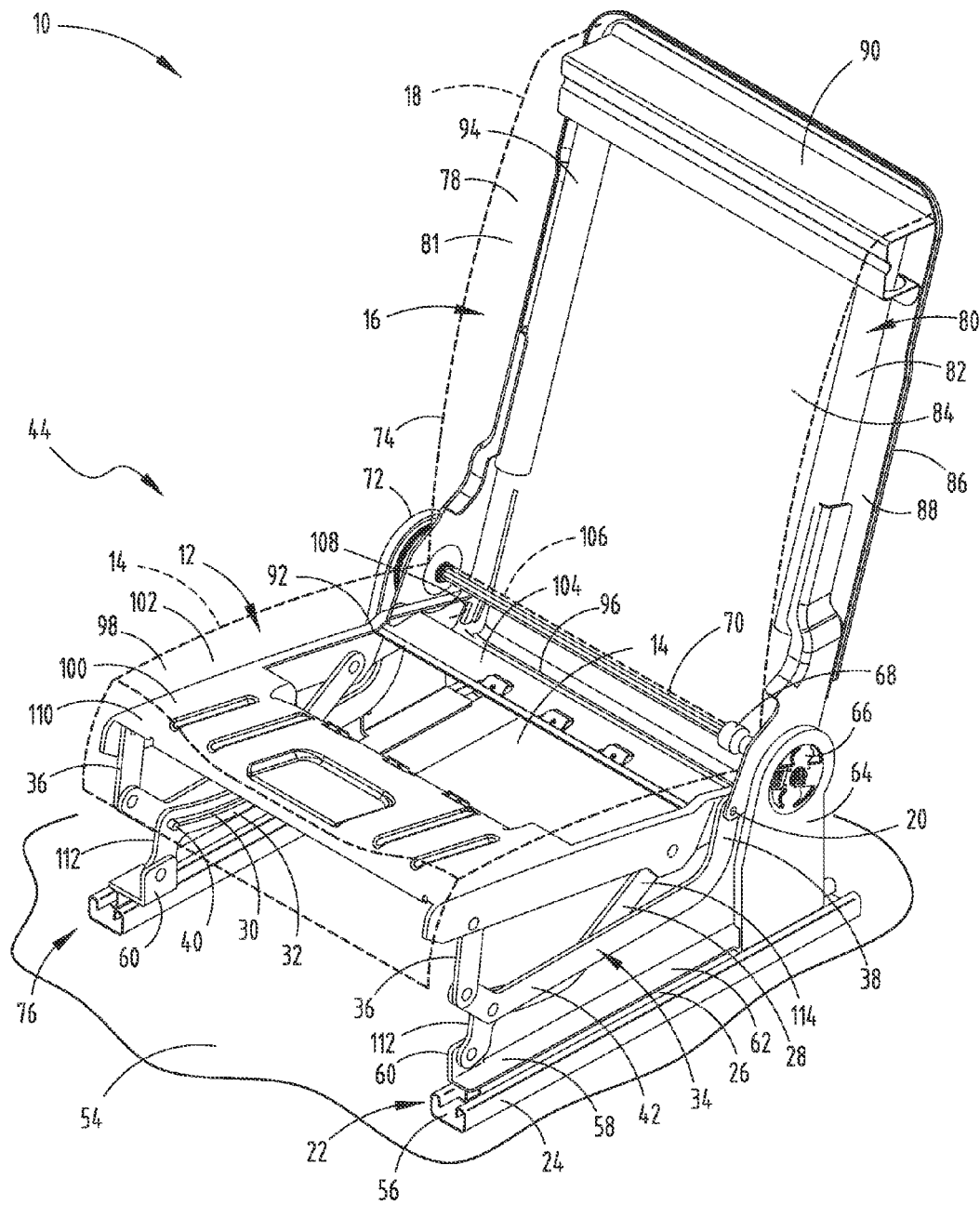
FIG. 2 is a top perspective view of a vehicle seating assembly of the present invention.

As shown in FIG. 2, the rail 24 of the track assembly 22 is coupled with the floor 54 of the vehicle 50 (FIG. 1). The slide 26 of the track assembly 22 is engaged with and supported by the rail 24, allowing the slide 26 to horizontally translate along the rail 24, and thereby adjust the horizontal fore and aft position of the vehicle seating assembly 10 relative to the floor 54 of the vehicle 50. A channel 56 is formed along an upper portion of the rail 24 to slidably contain the slide 26 and prevent vertical movement of the slide 26 within the rail 24. The slide 26 protrudes upwardly from the channel 56 in the rail 24. At a front end 58 of the slide 26, a base support 60 extends vertically from the slide 26 and couples with the bracket 28 to support the seat 12. At a back end 62 of the slide 26, a rear support 64 extends upwardly to couple with the seatback 16. Particularly, the seatback 16 couples with the rear support 64 about a recliner pivot 66. The recliner pivot 66 includes an actuating device 68 that operates to lock the angle of the planar extent of the seatback 16 relative to the planar extent of the seat 12. The recliner pivot 66 also includes a torsion bar 70 that extends between a corresponding rear support 72 on an opposing side 74 of the seatback 16 that is similarly engaged with a corresponding track assembly 76. It is also contemplated that a single track assembly or multiple track assemblies may be used to support the vehicle seating assembly. Many of the elements illustrated and described herein may include a corresponding mirror image element that is to be used on the opposing side of the vehicle seating assembly 10.

As further illustrated in FIG. 2, the seatback 16 includes a back cushion 78 disposed over a back frame 80. The back support surface 18 of the seatback 16 is defined by a forward facing surface 81 of the back cushion 78. A rear panel 84 of the seatback 16 is substantially planar and is defined by a rearward facing surface 86 of the seatback 16, which is substantially aligned with the back cushion 78. When the vehicle seating assembly 10 is in the deployed position 44, as shown in FIG. 2, the rear panel 84 of the seatback 16 is substantially orthogonal to a planar extent of the seat 12. The back frame 80 includes a side beam 82 vertically extending from the recliner pivot 66 along a side edge 88 of the rear panel 84 and coupling with a top beam 90 orthogonally extending therefrom across a top edge 92 of the rear panel 84. A corresponding side beam 94 extends along the opposing side 74 of the seatback 16, to form the substantially U-shaped back frame 80. The tab 20 extends forward from the side beam 82 of the back frame 80, where a base portion 96 of the seatback 16 couples with the recliner pivot 66 and the rear support 64.

The seat 12, as also illustrated in FIG. 2, includes a seat cushion 98 disposed over a seat pan 100. The top surface 14 of the seat is defined by an upward facing surface 102 of the seat cushion 98. A rearward portion 104 of the seat 12 includes a crease 106 formed by the seat cushion 98 abutting the back cushion 78 at the base portion 96 of the seatback 16. The rearward portion 104 of the seat 12 is supported by a hook 108 that extends from the rearward portion 104 of the seat 12 and engages a protuberance laterally extending inward from the rear support 64. The hook 108 provides vertical support to the rearward portion 104 of the seat 12 when the vehicle seating assembly 10 is in the deployed position 44, as the hook 108 is engaged with the protuberance in this position. A forward portion 110 of the seat 12 is supported by the base support 60 of the slide 26, which is coupled with the seat 12 by the bracket 28 and the linkage 34.

Still referring to FIG. 2, the linkage 34 extends between the forward portion 110 of the seat 12 at the first end 36 of the linkage 34 and the tab 20 at the second end 38 of the linkage 34. The protrusion 40 disposed at the intermediate portion 42 of the linkage 34 slidably engages the bracket 28, about the elongated slot 30 formed at the mid-portion 32 of the bracket 28. The bracket 28 extends between the base support 60 of the slide 26 and the rearward portion 104 of the seat 12. A forward slide connector 112 of the bracket 28 is coupled with the base support 60. The forward slide connector 112 extends substantially orthogonally from the mid-portion 32 of the bracket 28, which includes the elongated slot 30. Beyond the mid-portion 32 of the bracket 28, a rear engagement portion 114 of the bracket 28 extends upwardly and couples with the rearward portion 104 of the seat pan 100. Accordingly, the forward portion 110 and the rearward portion 104 of the seat are coupled with the base support 60 of the slide 26 by the linkage 34 and the bracket 28, respectively.

Figure 3:
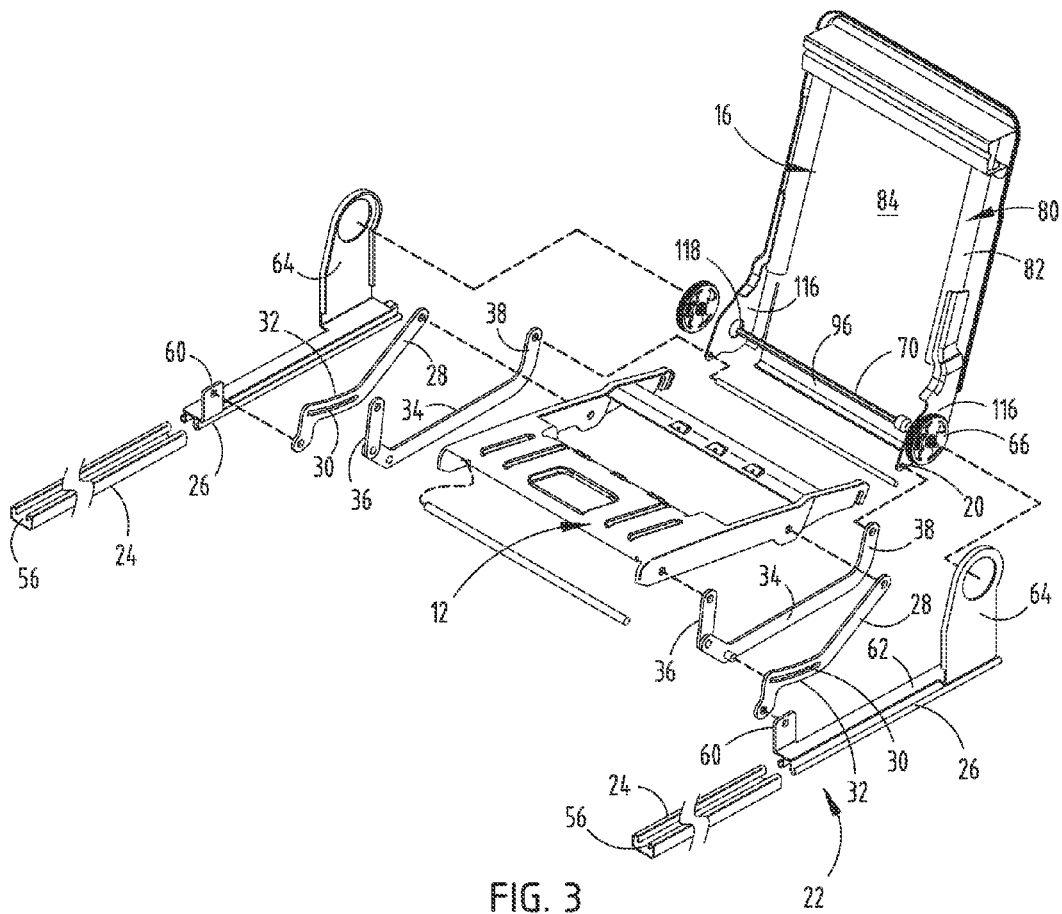
FIG. 3 is a top perspective exploded view of a vehicle seating assembly of the present invention.

As further illustrated in FIG. 3, the side beam 82 of the back frame 80 includes a lower disc portion 116 at the base portion 96 of the seatback 16 that is aligned with the recliner pivot 66 and is substantially orthogonal to the rear panel 84. The lower disc portion 116 has a centrally located aperture 118 formed therein to engage the torsion bar 70. The tab 20 extends forward from the lower disc portion 116 of the back frame 80 and down from the aperture 118. The second end 38 of the linkage 34 pivotally couples with the tab 20. The back frame 80 couples with recliner pivot 66, which in turn couples with the rear support 64. The slide 24 of the track assembly 22 fixedly supports the rear support 64 and the base support 60, and therefore, slidable movement of the slide 26 along the channel 56 of the rail 24 does not alter the orientation of the seatback 16 relative to the seat 12. However, the slidable movement of the slide 26 along the rail 24 alters the horizontal position of the seat 12 and seatback 16 relative to the rail 24 and the floor 54 of the vehicle 50 (FIG. 1). It is conceivable that the track assembly 22 is not incorporated with the vehicle seating assembly 10, and alternatively, the base support 60 and the rear support 64 extending from the slide 26 may be fixedly coupled to the floor 54 of the vehicle 50 (FIG. 1).

Figure 3A:
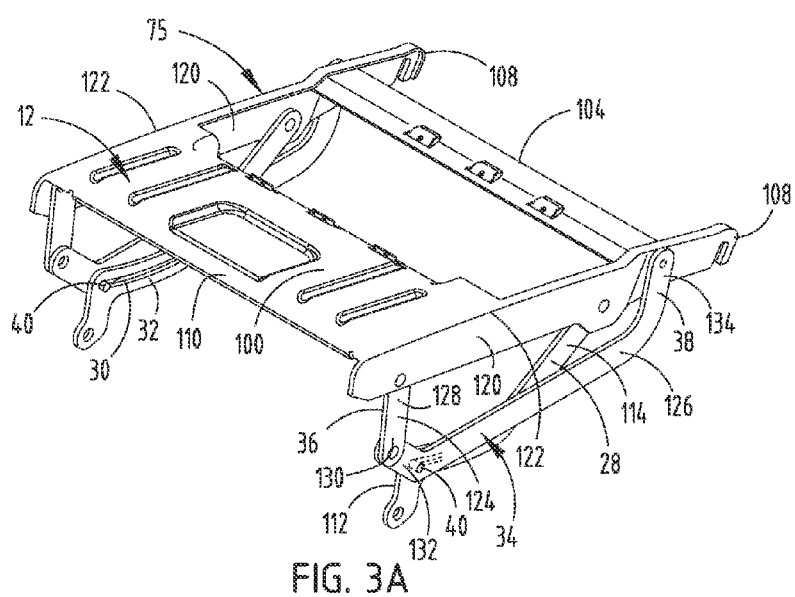
FIG. 3A is a top perspective view of a seat, a bracket, and a linkage of the vehicle seating assembly.

Referring now to FIG. 3A, the seat pan 100 is substantially rectangular-shaped and has flanges 120 orthogonally extending down along opposing edges 122 of the seat pan 100. The hooks 108 that extend from the rearward portion 104 of seat 12 are in alignment and are an extension of the flanges 120. Each flange 120 is a mirror image of the corresponding flange 120, and they couple with the bracket 28 and the first end 36 of the linkage 34. The linkage 34 includes a front link 124 and a rear link 126, wherein a top end 128 of the front link 124 pivotably couples with the flange 120 at the forward portion 110 of the seat pan 100. A bottom end 130 of the front link 124 pivotably couples with a front end 132 of the rear link 126. A rear end 134 of the rear link 126 pivotably couples with the tab 20 (FIG. 3). The protrusion 40 extends from the rear link 126 and slidably engages the elongated slot 30 formed in the mid-portion 32 of the bracket 28. The first end 36 and the second end 38 of the linkage correlates with the top end 128 of the front link 124 and the rear end 134 of the rear link 126, respectively. Between the connections of the flange 120 with the front link 124 and the tab 20 (FIG. 3) with the rear link 126 of the linkage 34, the bracket 28 pivotably couples with the flange 120 at the rear engagement portion 114 of the bracket 28. The forward slide connector 112 of the bracket 28 extends from the mid-portion 32 of the bracket 28 and pivotally couples with the base support 60 (FIG. 3). A corresponding linkage 34 and bracket 28 are positioned and similarly engaged with the opposing side of the seat 75.

Figure 4:
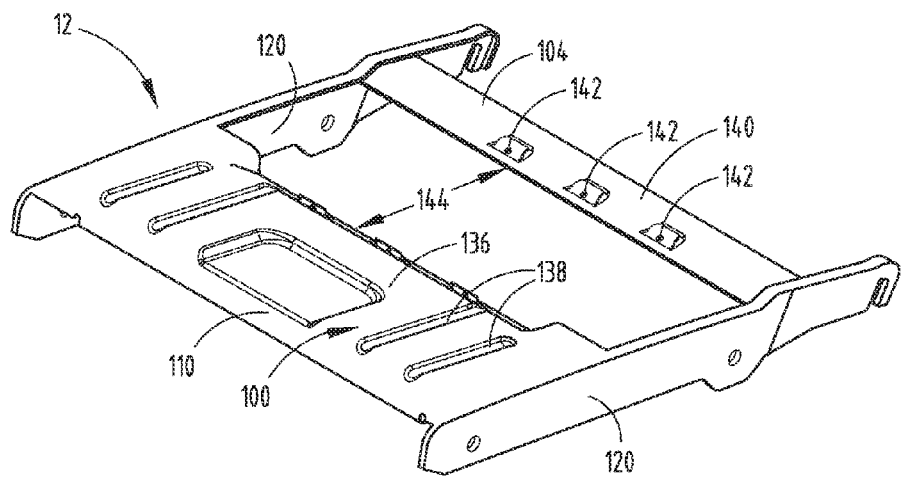
FIG. 4 is a top perspective view of a seat of the vehicle seating assembly.

As illustrated in FIG. 4, the forward portion 110 of the seat 12 includes a front cushion support 136 extending between the flange 120. The front cushion support 136 includes a substantially planar surface with grooves 138 formed horizontally in the fore-aft direction thereon. At the rearward portion 104 of the seat 12, a rear cushion support 140 extends between the flanges 120. A plurality of engagement members 142 extend upwardly from the rear cushion support 140. A space 144 is provided between the front cushion support 136 and the rear cushion support 140, allowing the seat cushion 78 (FIG. 2) to flex and compress into the space 144. The front and rear cushion supports 136, 140 are adapted to engage and secure the seat cushion 78 (FIG. 2) to the seat pan 100.

Figure 4A:
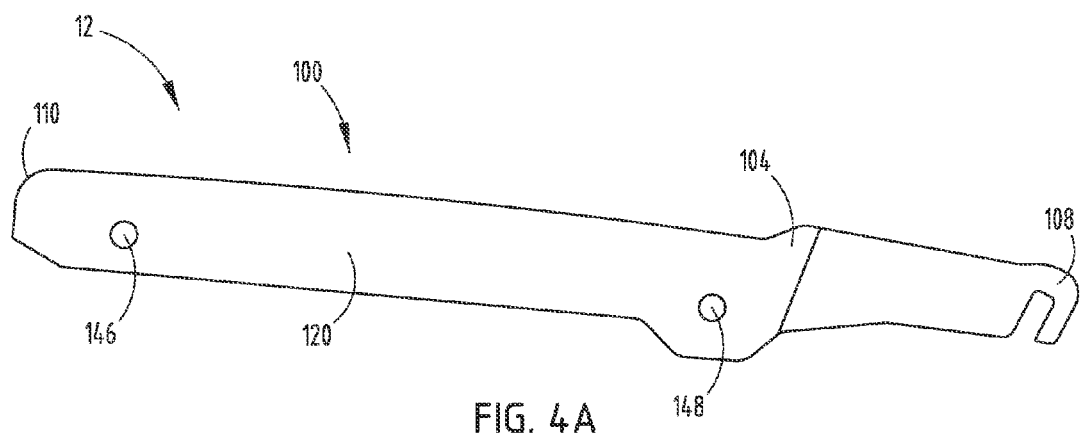
FIG. 4A is a side elevational view of the seat of FIG. 4.

Referring now to FIG. 4A, the flange 120 of the seat pan 100 extends from the forward portion 110 to the rearward portion 104 of the seat pan 100. A front hole 146 is formed in the forward portion 110 of the flange 120 to engage the top end 128 of the front link 124 of the linkage 34 (FIG. 3A). Likewise, a rear hole 148 is formed in the rearward portion 104 of the flange 120 to engage the rear engagement portion 114 of the bracket 28 (FIG. 3A). The hook 108 extends rearwardly from the rearward portion 104 of the seat pan 100. The hook 108 is positioned to face down, allowing the hook 108 to engage the protuberance (not shown) laterally extending inward from the rear support 64 (FIG. 3).

One embodiment of the bracket 28, as illustrated in FIGS. 5 and 5A, includes the substantially arcuate mid-portion 32 that has the substantially arcuate elongated slot 30 formed therein. The rear engagement portion 114 of the bracket 28 extends in a linear fashion upward at a slight angle from the mid-portion 32. The forward slide connector 112 of the bracket 28 extends down substantially orthogonally from the mid-portion 32 of the bracket 28 at the opposite end thereof from the rear engagement portion 114. Accordingly, a longitudinal extent of the entire bracket 28 is substantially non-linear. Connection apertures 150 are formed at the opposing ends of the bracket 28, such that one connection aperture 150 is formed in the forward slide connector 112 and one connection aperture 150 is formed in a distal end 152 of the rear engagement portion 114.

As shown in FIGS. 6 and 6A, one embodiment of the linkage 34 includes a front link 124 and a rear link 126 coupled thereto. The rear link 126 is substantially L-shaped, having a back member 154 extending upwardly at the rear end 134 of the rear link 126. At the front end 132 of the rear link 126, generally correlating with the intermediate portion 42 of the linkage 34, the protrusion 40 extends laterally from the linkage 34. Beyond the protrusion 40, the front end 132 of the rear link 126 extends upwardly at a slight angle to engage with the bottom end 130 of the front link 124. A longitudinal extent of the front link 124 is substantially linear, whereby the top end 128 of the front link 124 extends linearly upward from the bottom end 130 of the front link 124. Connection holes 156 are formed at the first end 36 and the second end 38 of the linkage 34, corresponding with the top end 128 of the front link 124 and the rear end 134 of the rear link 126, respectively. It is also contemplated that various alterations of the shape and connection points of the front link 124 and rear link 126 may be made to accomplish the similar function of the linkage 34, as described in more detail below.

Figure 7:
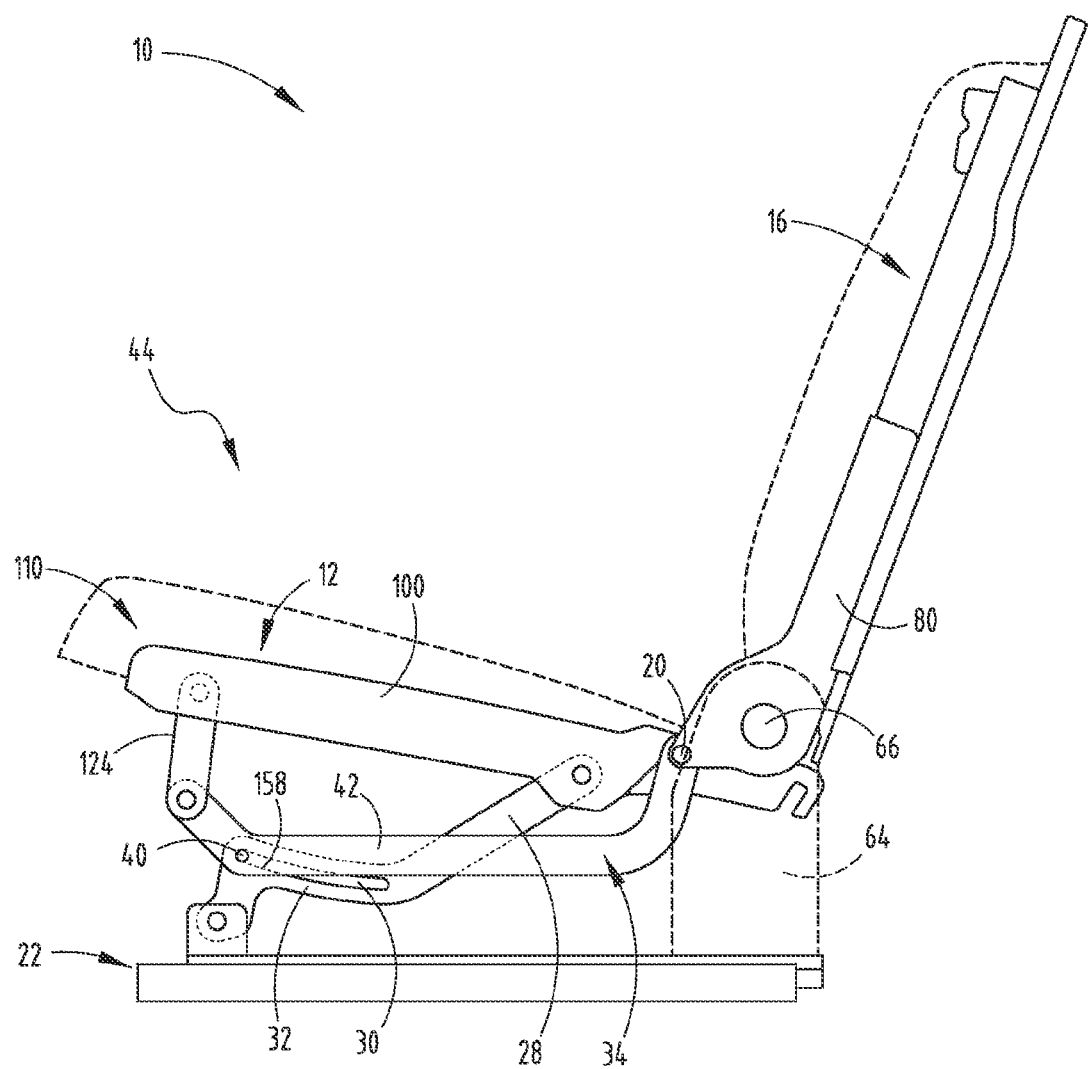
FIG. 7 is a side elevational view of a vehicle seating assembly in the deployed position.

Referring now to FIG. 7, the vehicle seating assembly 10 is illustrated in the deployed position 44. In the deployed position 44, the protrusion 40 of the linkage 34 is engaged with a forward portion 158 of the elongated slot 30 that is disposed along the mid-portion 32 of the bracket 28. Similarly in this position, the front link 124 of the linkage 34 is positioned substantially orthogonal with respect to the seat pan 100 and a longitudinal extent of the intermediate portion 42 of the linkage 34. In addition, in this position, the tab 20 extends forward from the rear support 64 and the back frame 80 of the seatback 16. Also, in the deployed position 44, the planar extent of the seatback 16 extends substantially orthogonally relative to the planar extent of the seat 12. It is contemplated that the seatback 16 may be reclined back about the recliner pivot 66 while the vehicle seating assembly 10 is in the deployed position 44, thereby altering the position of the seatback 16 relative to the seat 12; however, the deployed position 44 of the vehicle seating assembly 10, as illustrated, is described herein. Other relative configurations of elements of the vehicle seating assembly 10 in the deployed position 44 may be readily appreciated from FIGS. 1-7.

Figure 8:
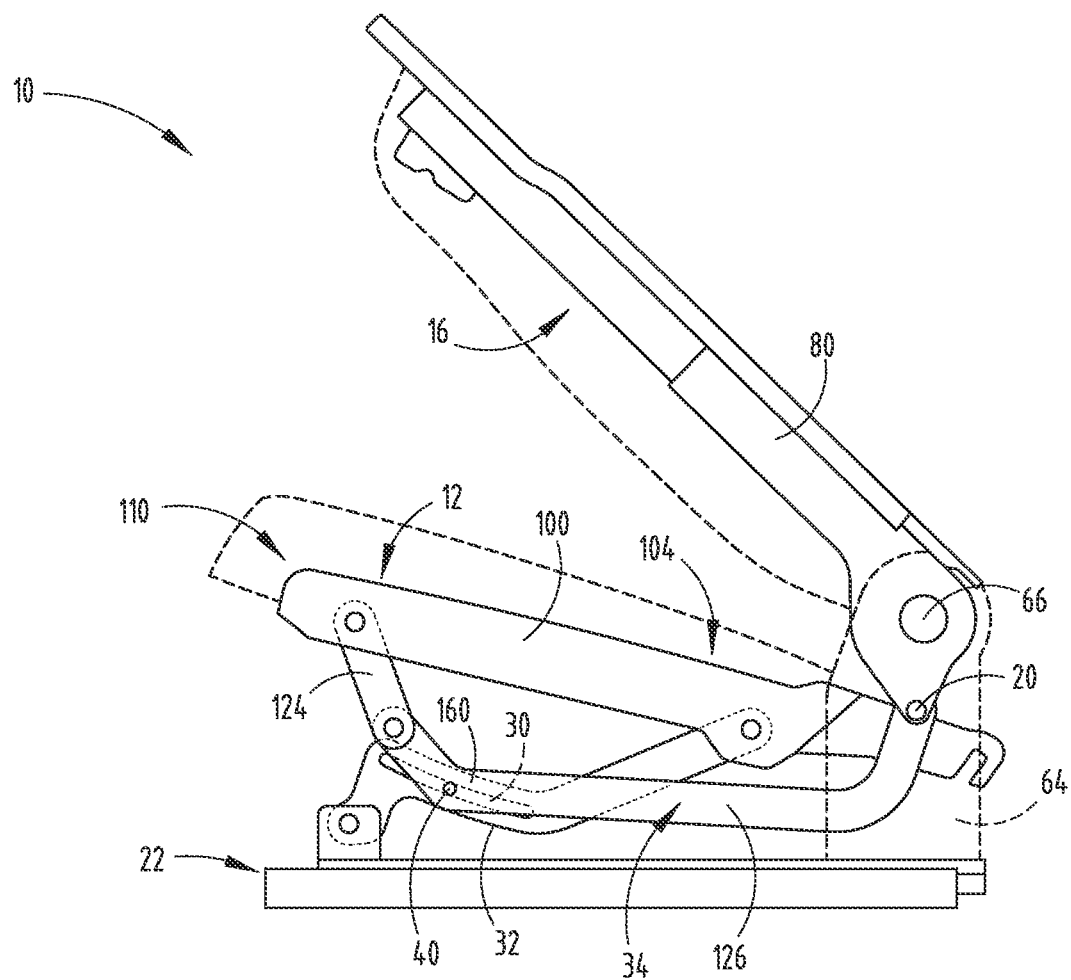
FIG. 8 is a side elevational view of a vehicle seating assembly transitioning between the deployed position and a stowed position.
Figure 9:
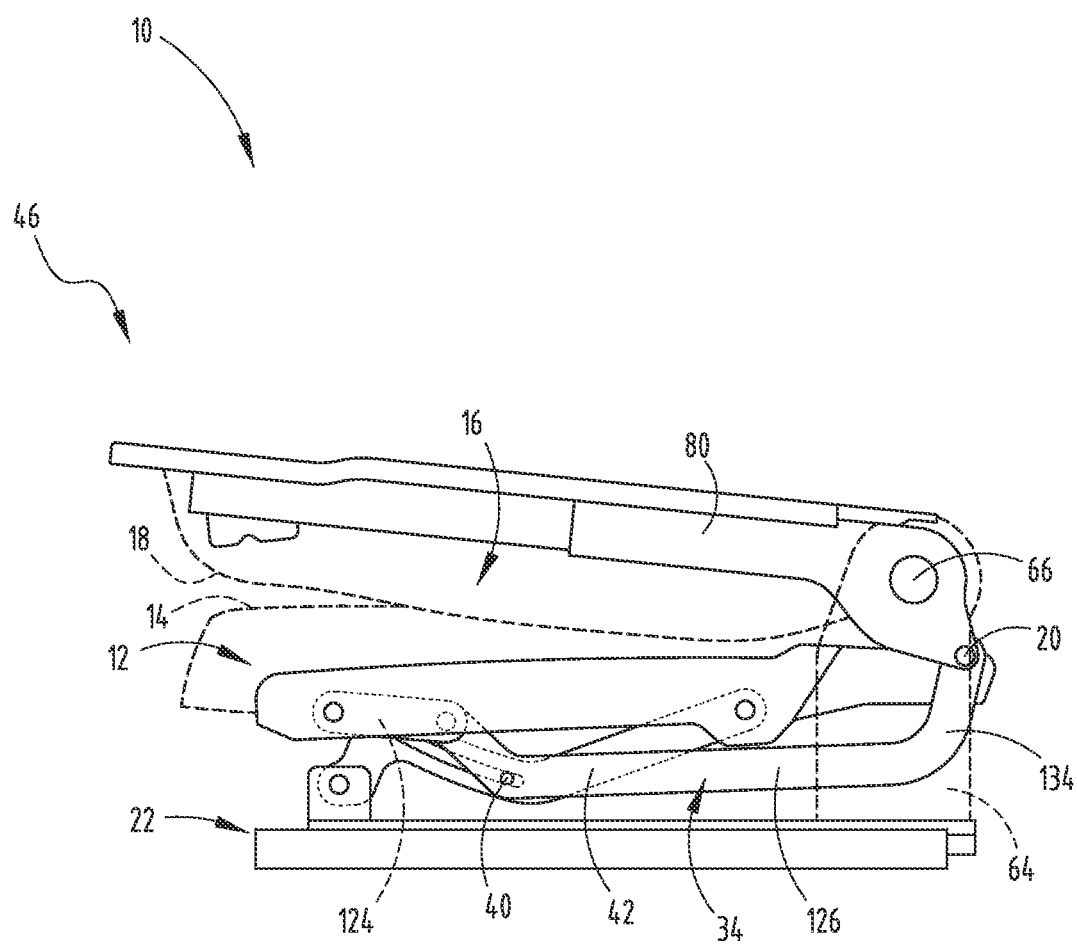
FIG. 9 is a side elevational view of a vehicle seating assembly in the stowed position.

As shown in FIG. 8, the vehicle seating assembly 10 is transitioning between the deployed position 44 (FIG. 7.) and the stowed position 46 (FIG. 9). During the transition to the stowed position 46, the seatback 16 pivots forward about the recliner pivot 66 to angle forward, causing the tab 20 to rotate about the recliner pivot 66 and move counter-clockwise, in the rearward direction. The tab 20 moving in the rearward direction, as illustrated, causes the linkage 34 to likewise move in the rearward direction, which results in the protrusion 40 sliding rearward in the elongated slot 30. As a result of the protrusion 40 sliding down rearwardly to a middle portion 160 of the elongated slot 30, the front link 124 of the linkage 34 begins to angle forward, similar to the repositioning of the seatback 16. The forward portion 110 of the seat 12 and seat pan 100 briefly rise to facilitate the pivoting motion of the front link 124 and the rearward movement of the rear link 126, before starting to lower toward the track assembly 22. Likewise, the rearward portion 104 of the seat 12 and seat pan 100 begin to lower towards the track assembly 22 and the floor 54 of the vehicle (FIG. 1). As the seatback 16 continues to fold in the forward direction, the protrusion 40 continues to slide rearward along the middle portion 160 of the elongated slot 30.

Referring now to FIG. 9, the vehicle seating assembly 10 is illustrated in the stowed position 46. In the stowed position 46, the top surface 14 of the seat 12 and the back support surface 18 of the seatback 16 are in a butting contact. The front link 124 of the linkage 34 is positioned such that the longitudinal extent of the front link 124 is substantially parallel to a planar extent of the seatback 16, namely the back frame 80 of the seatback 16. Likewise, the planar extent of the seat 12 is substantially parallel to the longitudinal extent of the intermediate portion 42 of the linkage 34. The counter-clockwise rotation of the tab 20 about the recliner pivot 66 repositions the rear end 134 of the rear link 126 below the recliner pivot 66. By the tab 20 drawing the linkage 34 in rearward direction, the tab 20 is rotated to a position behind the recliner pivot 66 and the seatback 16. Notably, in the stowed position 46, the track assembly 22 may be used to adjust the horizontal fore and aft position of the vehicle seating assembly 10 relative to the floor 54 of the vehicle 50 (FIG. 1).

Figure 10:
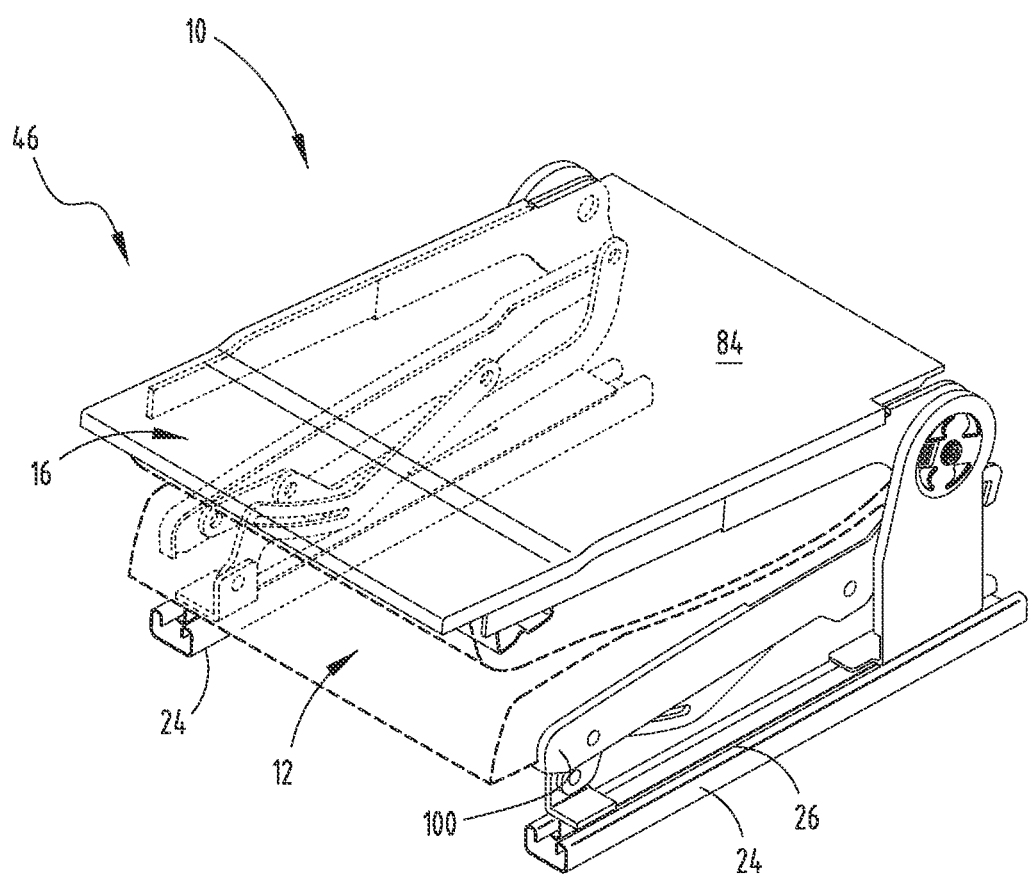
FIG. 10 is a top perspective view of a vehicle seating assembly in the stowed position.

As further illustrated in FIG. 10, the vehicle seating assembly 10 in the stowed position 46 positions a planar extent of the seatback 16 in substantial parallel alignment with the rail 24 and slide 26 of the track assembly 22 (FIG. 9). As such, the rear panel 84 of the seatback may be used within the vehicle 50 (FIG. 1) as a substantially level storage surface. In addition, in the stowed position 46, the seat 12 and seat pan 100 are collapsed to a closer proximity, relative to the deployed position 44 (FIG. 7), with the track assembly 22 and the floor 54 of the vehicle 50 (FIG. 1).

From the stowed position 46, as shown in FIG. 10, the vehicle seating assembly 10 may rise to the deployed position 44 (FIG. 7) by transitioning through a reverse series of the steps as described above. The reverse series of steps includes lifting the top edge 92 (FIG. 2) of the seatback 16 in the rearward direction about the recliner pivot 66 (FIG. 9), causing the tab 20 (FIG. 9) to rotate about the recliner pivot 66 and move clockwise in the forward direction. Accordingly, the transitional step from the stowed position 46 to the deployed position 44 is substantially identical to the transitional step illustrated in FIG. 8. Upon engaging the vehicle seat assembly 10 in the deployed position 44, the vehicle seating assembly 10 will again assume the characteristics for such position, as described in detail above.

As the vehicle seating assembly 10 is articulated between the deployed position 44 (FIG. 7) and the substantially flat stowed position 46 (FIG. 9), the seat 12 and the seat cushion 98 are collapsed substantially rearward, in addition to collapsing downward to a closer proximity with the floor 54 of the vehicle 50 (FIG. 1). It is contemplated that the rearward and downward collapsed orientation of the seat 12 and the seat cushion 98 in the stowed position 46 permits a head restraint portion attached to the top beam 90 of the seatback 16 to freely occupy an area in front of the a forward portion 110 of the seat 12, including the a foot area between the vehicle seating assembly 10 and any vehicle seat that may be positioned in front of the vehicle seating assembly 10. Further, it is contemplated that that the rearward collapsed orientation of seat 12 and the seat cushion 98 in the stowed position 46 permits any vehicle seat that may be positioned in front of the vehicle seating assembly 10 to freely adjust the horizontal fore and aft position of such vehicle seat.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly, comprising:
   a seat including a top surface;
   a seatback pivotally coupled with the seat and including a back support surface;
   a tab extending forward from a lower portion of the seatback;
   a track assembly below the seat and including a rail and a slide;
   a bracket pivotally coupled directly at opposing ends with the seat and the slide and including an elongate slot disposed at a mid-portion thereof; and
   a linkage having a first link with a forward end coupled directly with the seat and a second link pivotally coupled directly with the tab and a rearward end of the first link, wherein the second link includes a protrusion slidably engaged with the elongate slot, wherein pivotal movement of the seatback forward to a stowed position moves the tab rearward and causes sliding movement of the protrusion relative to the elongate slot, thereby translating the seat from a deployed position, in which a planar extent of the seatback extends substantially orthogonally relative to a planar extent of the seat, rearward and downward to a collapsed position, in which the top surface of the seat and the back support surface of the seatback are in abutting contact.

2. The vehicle seating assembly of claim 1, wherein the first link is pivotally coupled with a forward portion of the seat.

3. The vehicle seating assembly of claim 1, wherein the elongate slot of the bracket is substantially arcuate.

4. The vehicle seating assembly of claim 1, wherein the seatback is rotatable about a recliner pivot, and wherein rotational movement of the seatback about the recliner pivot in a forward direction rotates the tab and the second link rearward.

5. The vehicle seating assembly of claim 1, wherein the bracket includes a rear engagement portion, an intermediate arcuate portion, and a forward slide connector.

6. The vehicle seating assembly of claim 5, wherein a longitudinal extent of the bracket is substantially nonlinear, and wherein the forward slide connector extends substantially orthogonally from the intermediate arcuate portion.

7. A vehicle seating assembly, comprising:
- a seat coupled to a seatback;
- a bracket extending between and pivotally coupled at opposing ends with a rearward portion of the seat and a base fixed below the seat; and
- a linkage comprising:
  - a first link pivotally coupled directly with a forward portion of the seat;
  - a second link pivotally coupled directly at a front end with the first link and at an opposing rear end with the seatback; and
  - an intermediate portion second link slidably engaged with the bracket, wherein movement of the seatback between and upright position and a forward stowed position causes the intermediate portion to slide relative to the bracket, which moves the seat respectively between a deployed position and a lowered collapsed position.

8. The vehicle seating assembly of claim 7, wherein the bracket includes an elongate slot disposed at a middle portion thereof.

9. The vehicle seating assembly of claim 8, further comprising:
- a protrusion disposed at the intermediate portion of the second link and engaged with the elongate slot for providing sliding movement therebetween.

10. The vehicle seating assembly of claim 9, further comprising:
- a recliner pivot disposed along a bottom edge of the seatback; and
- a tab disposed at a forward portion of the seatback and pivotally connected with the second link.

11. The vehicle seating assembly of claim 10, wherein rotational movement of the seatback about the recliner pivot causes the tab to draw the second link backward along the elongate slot and move the seat from the deployed position to the lowered collapsed position.

12. The vehicle seating assembly of claim 10, further comprising:
- an actuating device engaged to the recliner pivot, wherein the actuating device operates to lock the angle of a planar extent of the seatback relative to a planar extent of the seat.

13. The vehicle seating assembly of claim 7, wherein the bracket includes an elongate body that is substantially non-linear.

14. The vehicle seating assembly of claim 7, wherein the base is coupled to a track assembly.

15. A vehicle seating assembly, comprising:
- a seat;
- a seatback pivotal about an axis;
- a front link pivotally coupled with a rear link, wherein opposing ends of the front and rear links are pivotally coupled directly with the seat and the seatback below the axis, respectively; and
- a bracket directly coupled between the seat and a floor, wherein pivoting the seatback forward moves the second linkage rearward along a slot in the bracket, lowering the seat.

16. The vehicle seating assembly of claim 15, wherein the seatback is rotatable about a recliner pivot aligned with the axis, and wherein the recliner pivot includes and actuating device that operates to lock the angle of seatback relative the seat.

17. The vehicle seating assembly of claim 15, wherein the bracket includes a rear engagement portion, an intermediate arcuate portion, and a forward slide connector.

18. The vehicle seating assembly of claim 15, further comprising:
- a base coupled with a track assembly on the floor, wherein the bracket is coupled directly with the base.

* * * * *